Figure 28:
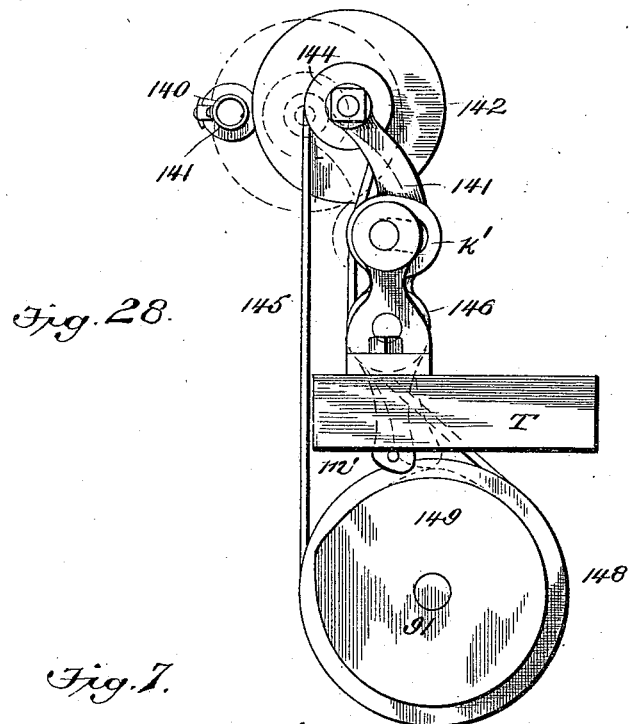

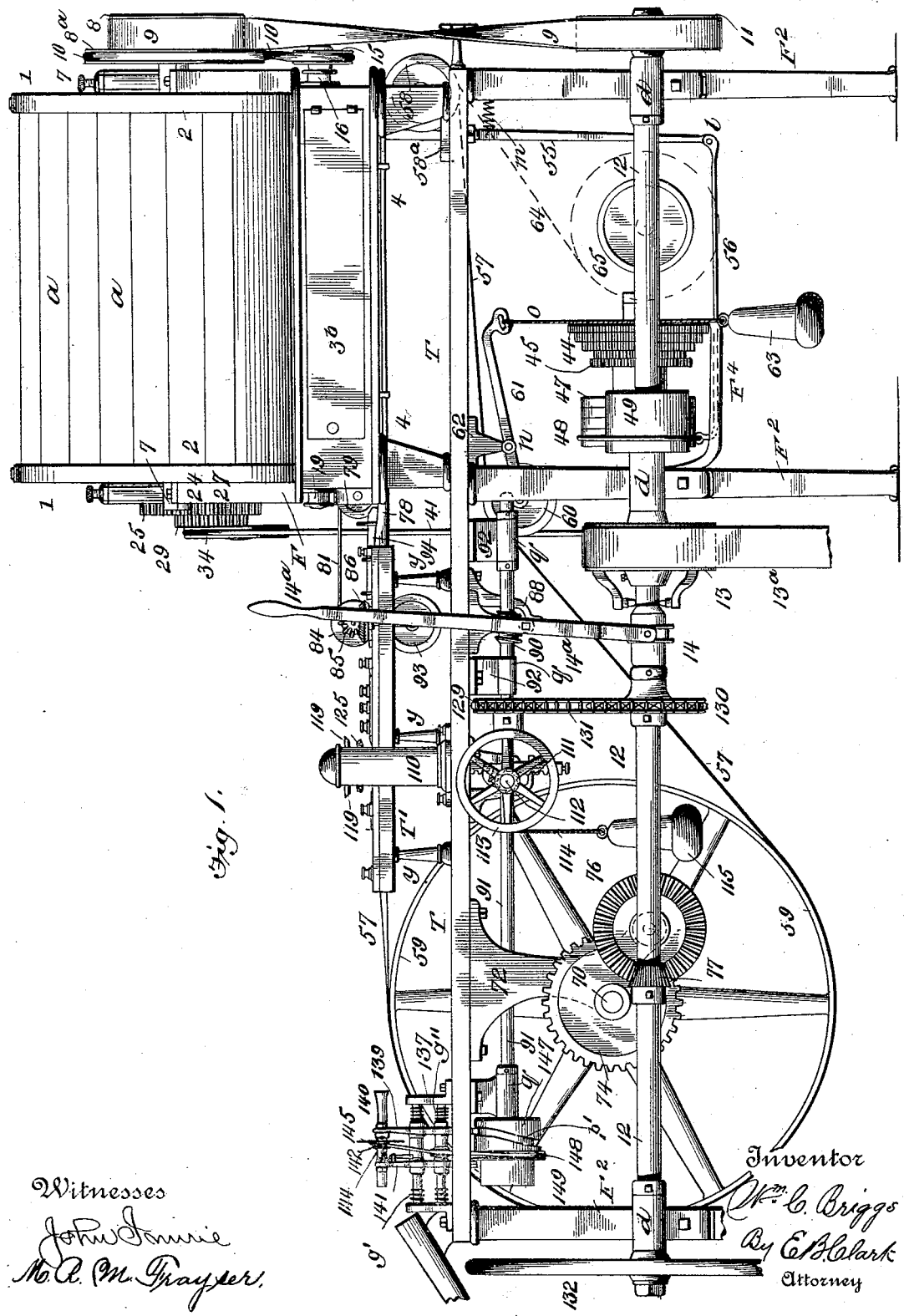

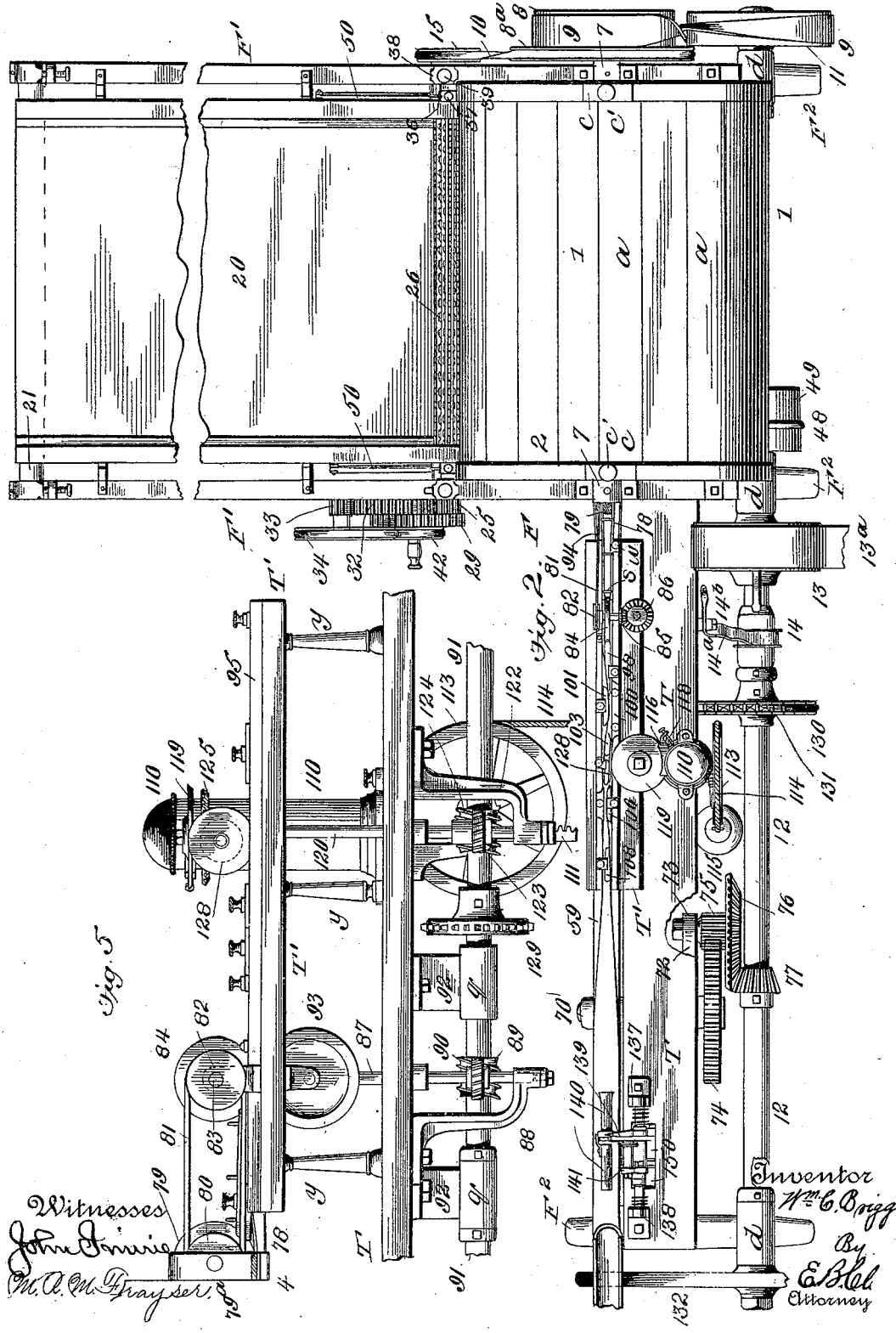

(No Model.) 9 Sheets—Sheet 3.
W. C. BRIGGS.
CIGARETTE MACHINE.
No. 512,151. Patented Jan. 2, 1894.
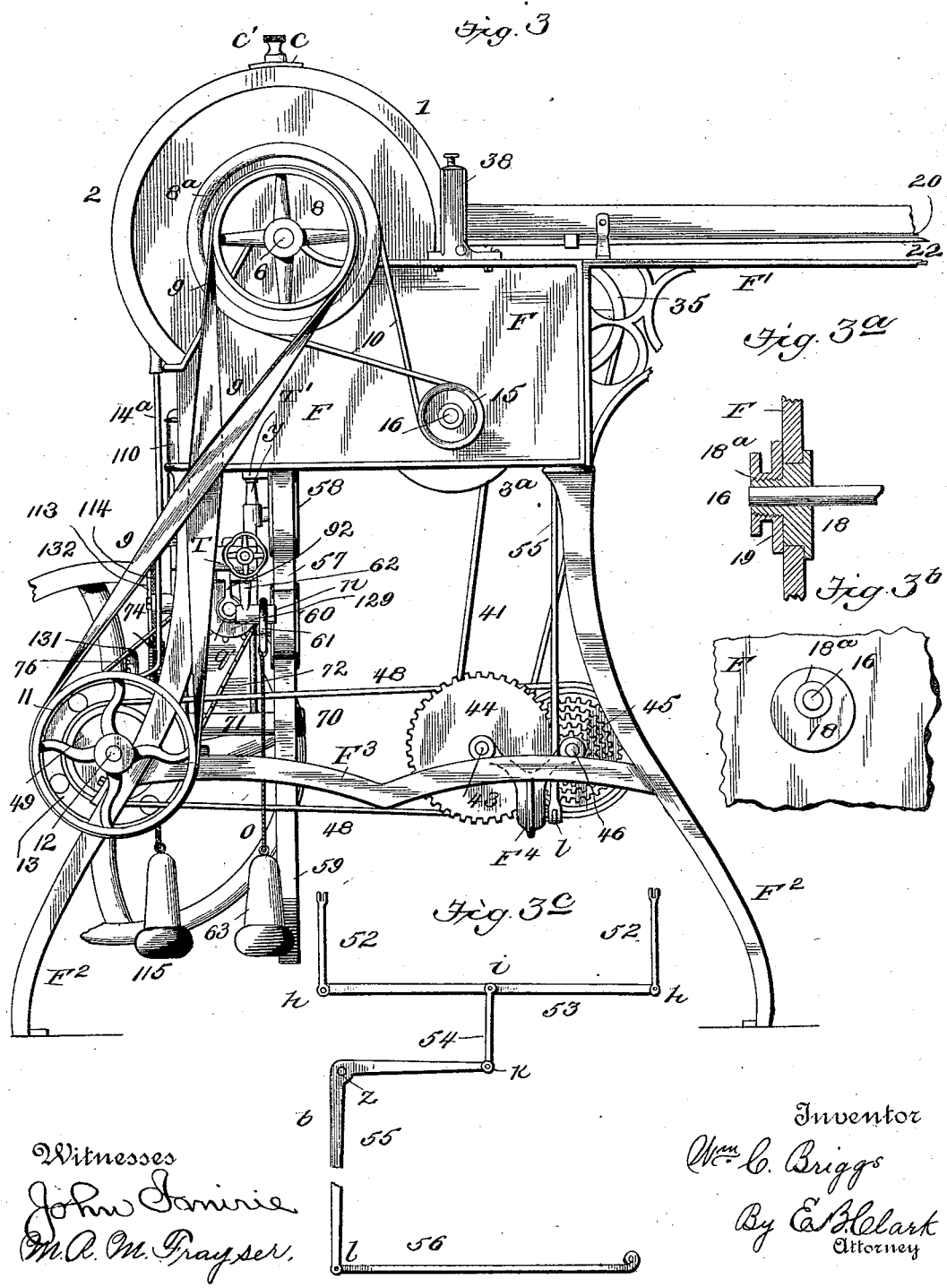

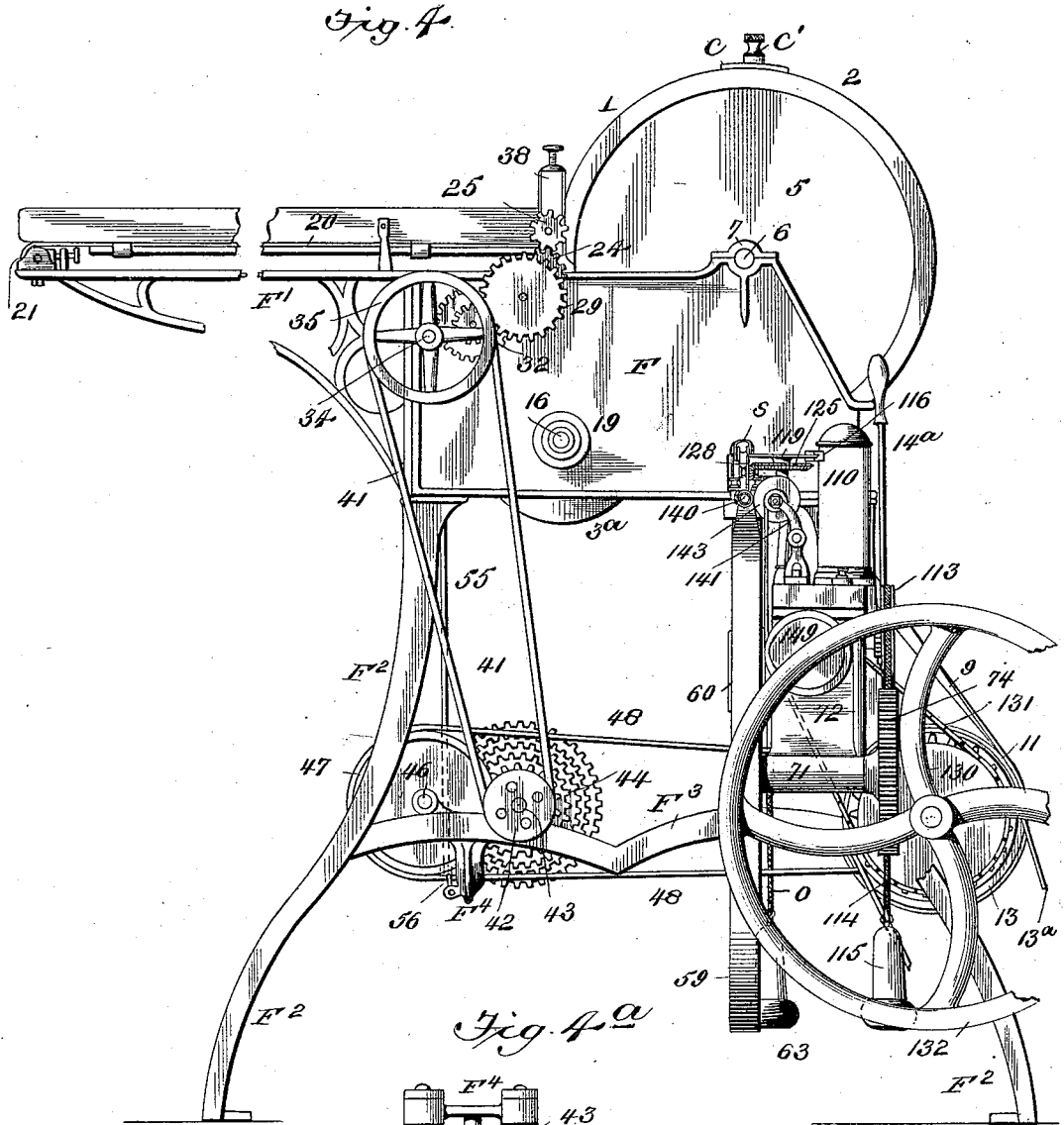

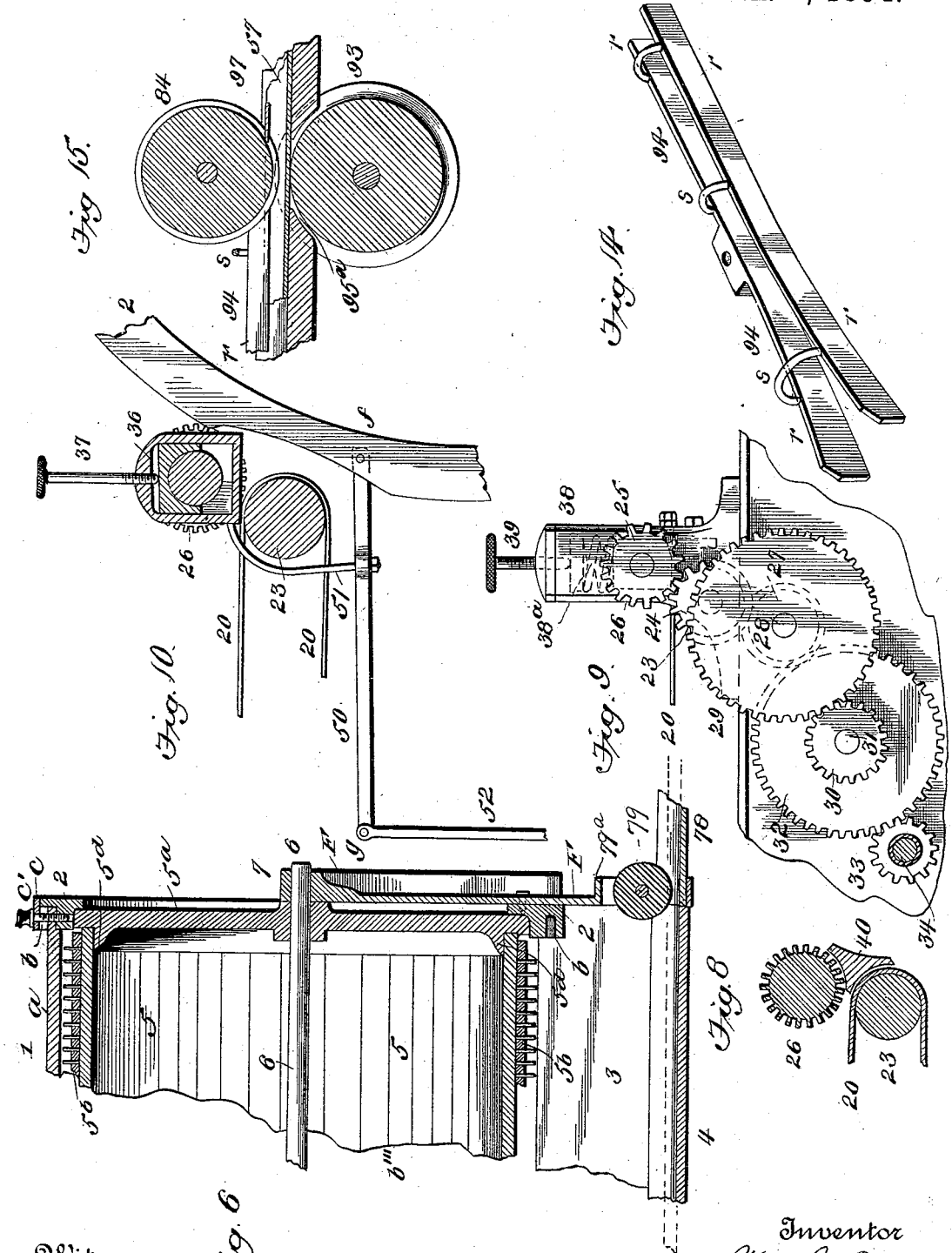

(No Model.) 9 Sheets—Sheet 6.

W. C. BRIGGS.
CIGARETTE MACHINE.

No. 512,151. Patented Jan. 2, 1894.

Witnesses
Inventor
Wm. C. Briggs
By E. B. Clark
Attorney

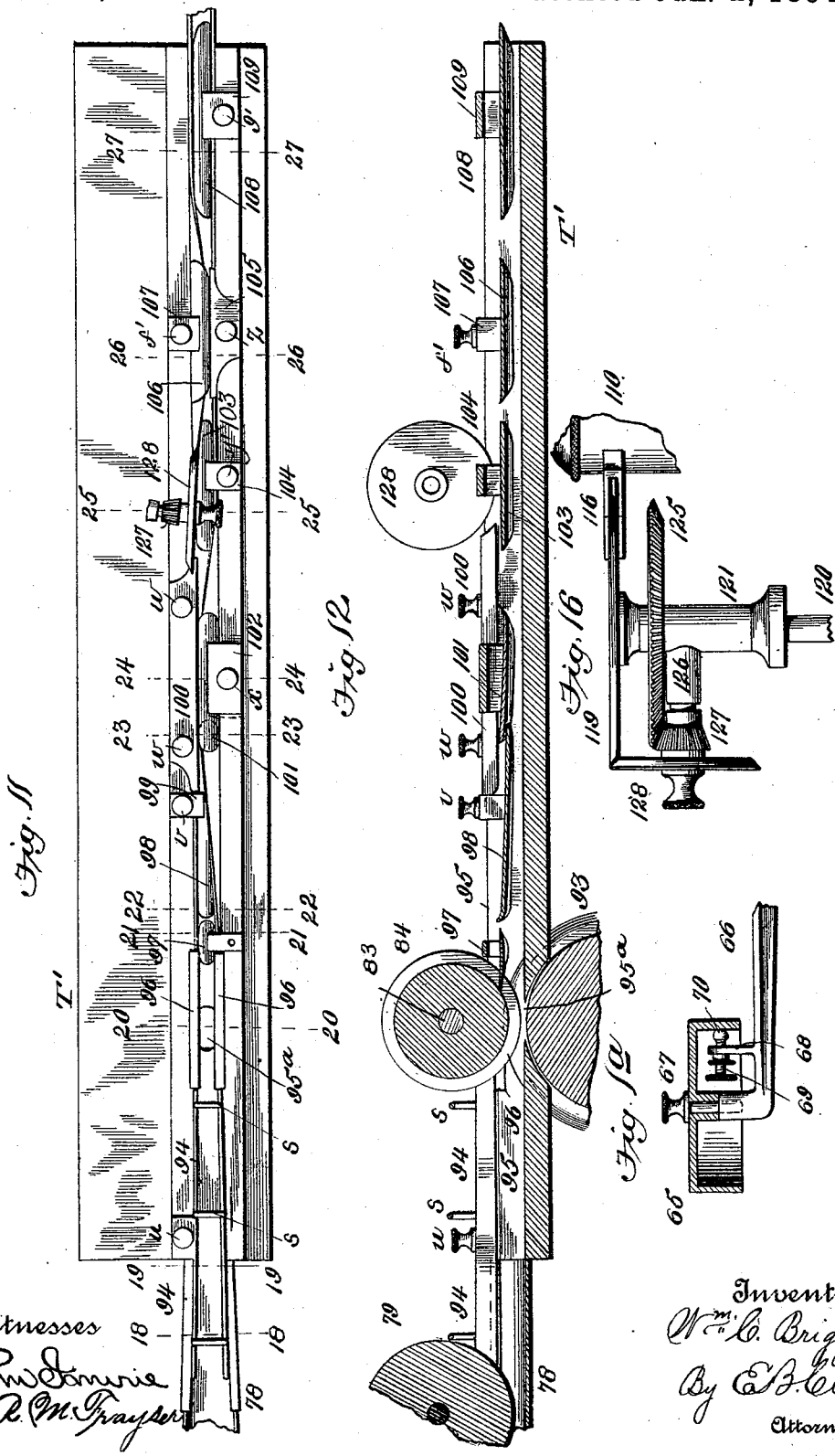

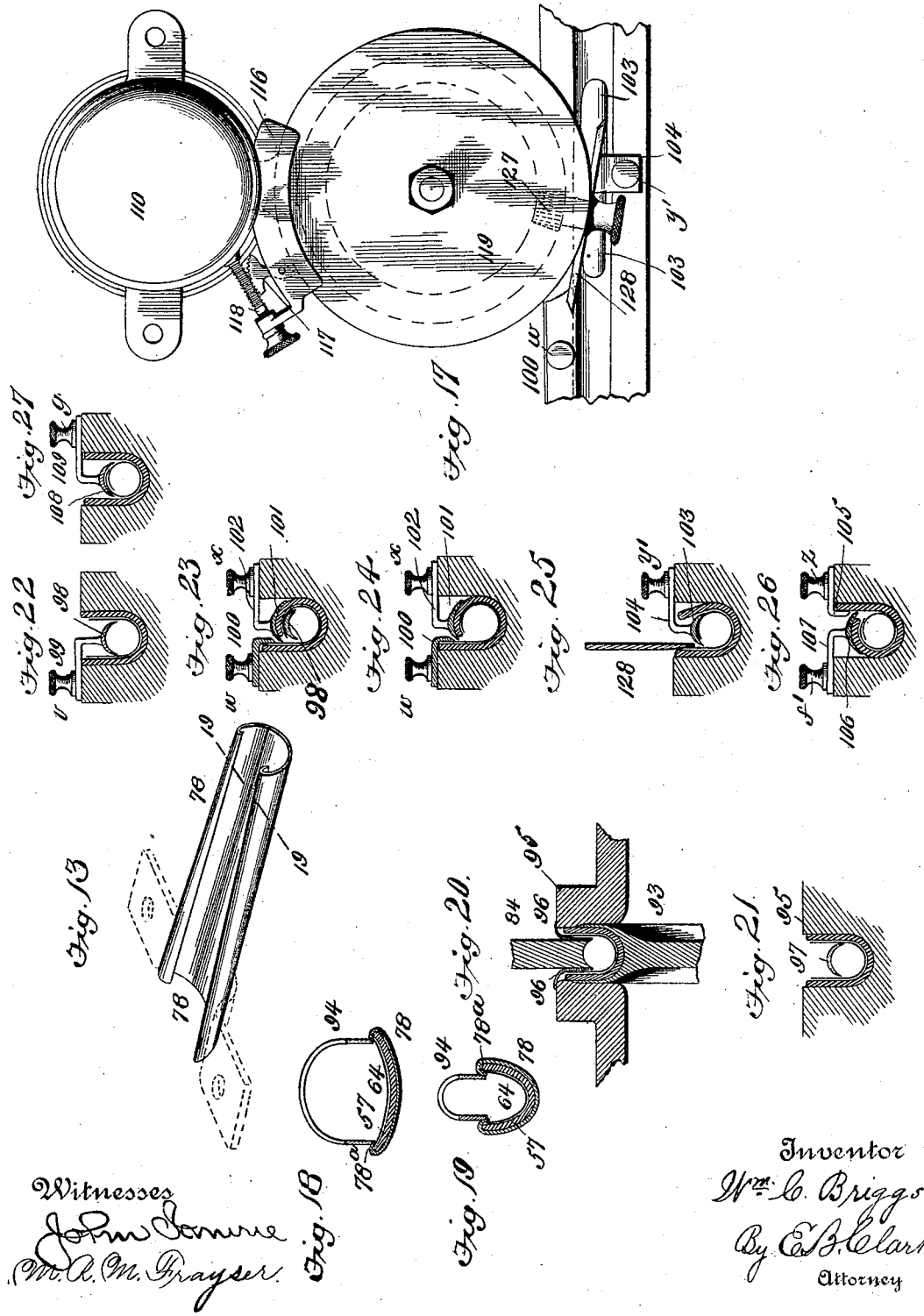

(No Model.)
9 Sheets—Sheet 9.
W. C. BRIGGS.
CIGARETTE MACHINE.
No. 512,151. Patented Jan. 2, 1894.
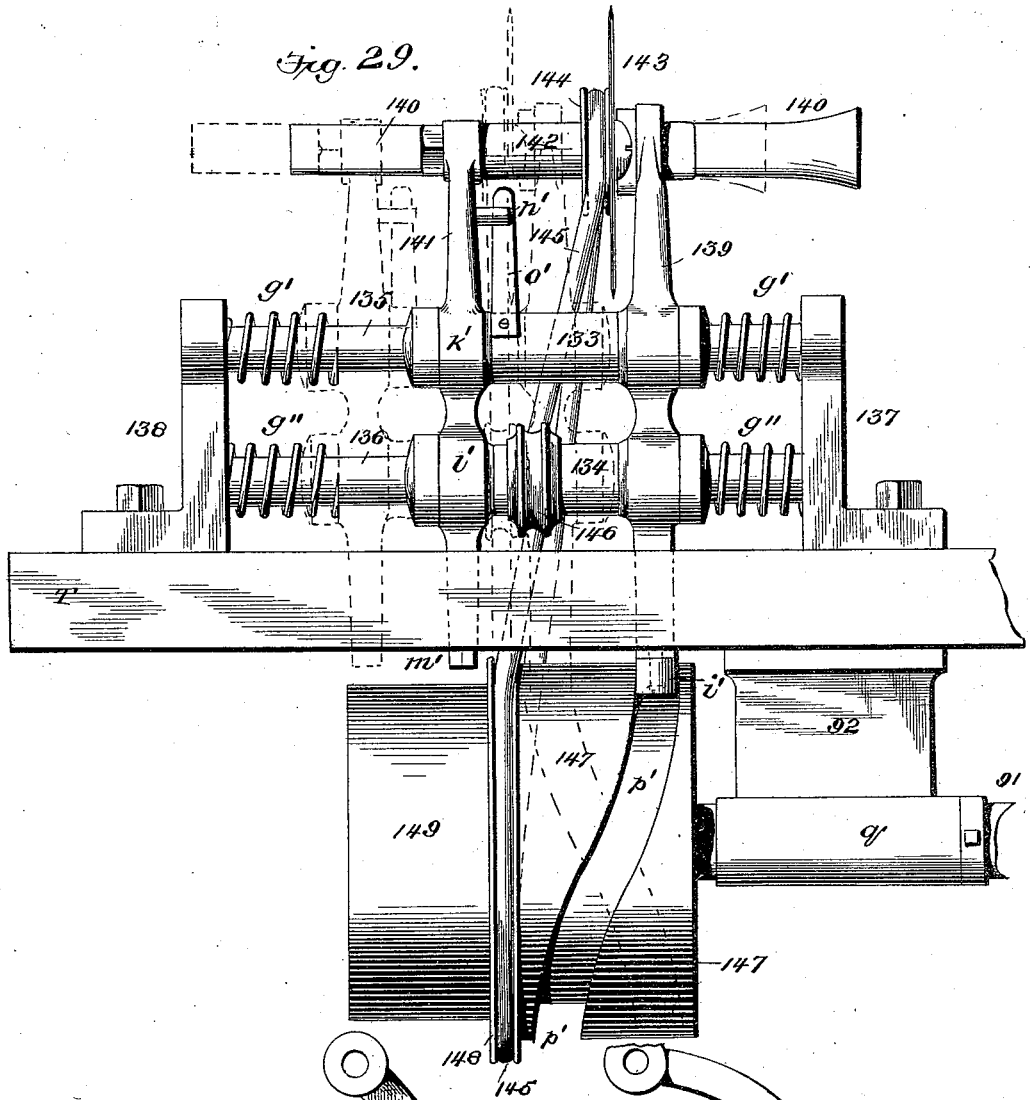
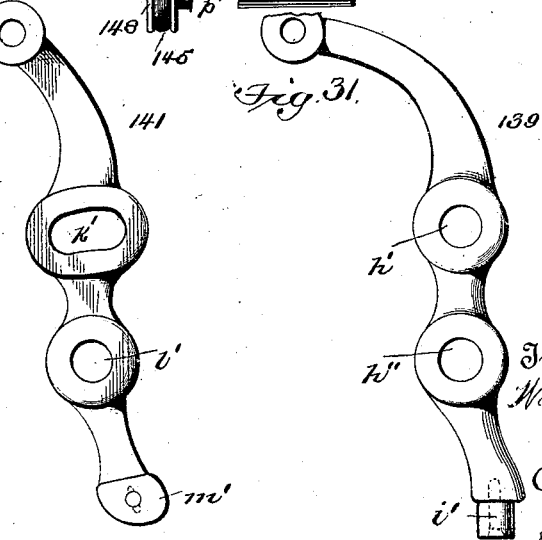
Witnesses
Inventor
Wm. C. Briggs
By E. B. Clark
Attorney
THE NATIONAL LITHOGRAPHING COMPANY,
WASHINGTON, D. C.

UNITED STATES PATENT OFFICE.

WILLIAM C. BRIGGS, OF WINSTON, NORTH CAROLINA, ASSIGNOR TO THE WINSTON CIGARETTE MACHINE COMPANY OF NORTH CAROLINA.

CIGARETTE-MACHINE.

SPECIFICATION forming part of Letters Patent No. 512,151, dated January 2, 1894.

Application filed July 27, 1893. Serial No. 481,620. (No model.)

*To all whom it may concern:*

Be it known that I, WILLIAM C. BRIGGS, a citizen of the United States, residing at Winston, in the county of Forsyth and State of North Carolina, have invented certain new and useful Improvements in Cigarette-Machines; and I do hereby declare the following to be a full, clear, and exact description of the invention, such as will enable others skilled in the art to which it appertains to make and use the same.

This invention relates to that class of cigarette machines known as "continuous filler machines" in which the tobacco stock is formed into a continuous roll or rod called the filler-rod, and is inclosed in a continuous wrapper which is supplied with paste and then sealed around the filler-rod forming a continuous cigarette as it travels forward which is cut into short lengths to form merchantable cigarettes.

My present invention embraces certain improvements upon my invention of a cigarette machine described in my application for patent filed July 8, 1892, and having Serial No. 439,385.

The objects of my invention are to provide improvements in mechanism for feeding tobacco stock and distributing it so as to form a loose roll containing the requisite quantity to form the filler-rod; also improved governor mechanism connecting directly with one of the feed rollers for automatically controlling and regulating the feed or supply of tobacco stock to the carding cylinder, whereby greater accuracy and uniformity in the feed are secured; also improvements in compressing and rolling the tobacco stock into the form of a rod; also improvements in the pasting devices including operating gearing, whereby the application of paste to one edge of the paper wrapper is made more positive and uniform; also improvements in the folding and forming channel, including certain attachments for smoothing down the tobacco stock, turning over the pasted edges of the paper wrapper and sealing the pasted edge of the wrapper upon the other edge so as to inclose the filler-rod; also improved cutting mechanism, which is simplified and made more accurate and effective.

In addition to the principal mechanism and main features of construction for carrying out the objects above stated, my machine embraces certain details of construction forming part of my invention by means of which a more perfectly operating machine is produced, as will be specified in connection with the drawings and pointed out in the claims.

My improved machine is illustrated in the accompanying drawings, in which—

Figure 7:
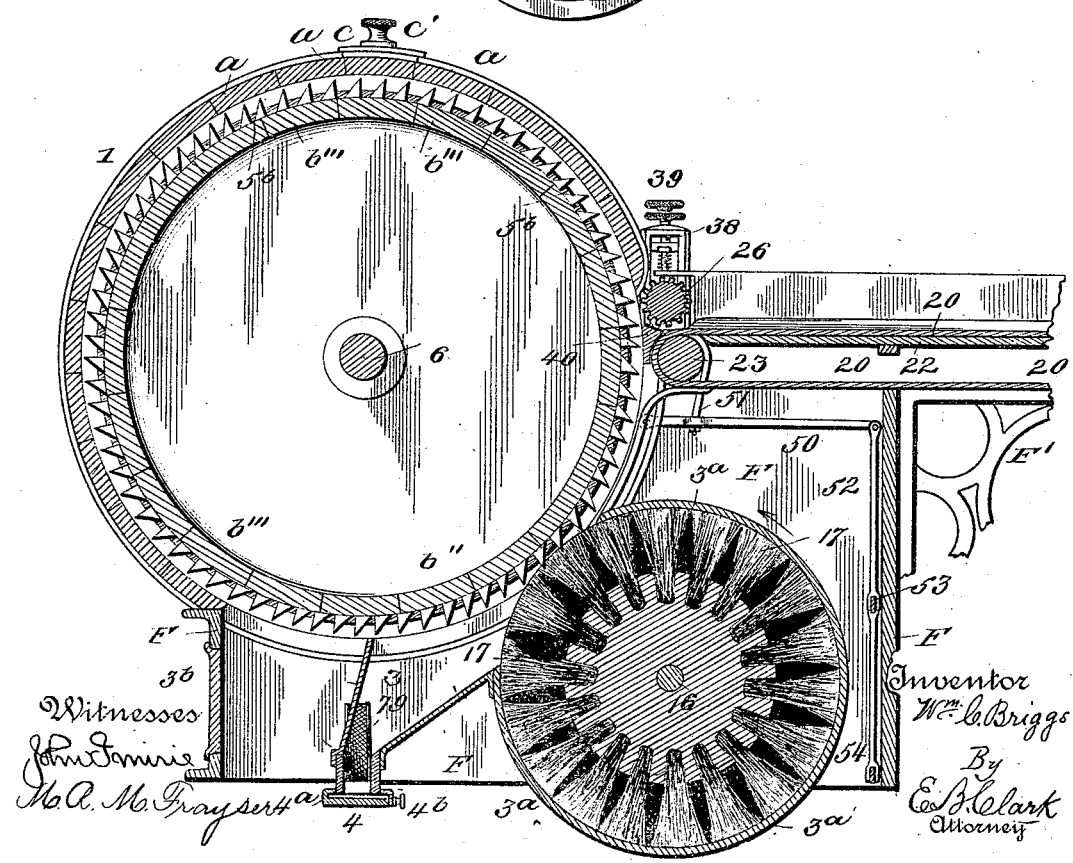

Figure 1 represents a left hand side elevation of the machine. Fig. 1ª (Sheet 7) represents a sectional detail of the paper ribbon reel. Fig. 2 represents a top plan view of the machine with a portion of the feed apron and frame broken away. Fig. 3 represents a front end elevation of the machine with part of the feed apron and frame broken away. Figs. 3ª and 3ᵇ represent detail views of an adjusting device for the revolving brush. Fig. 3ᶜ represents a detail view of part of the governor mechanism. Fig. 4 represents an elevation of the rear end of the machine, where the finished cigarette issues, with part of the feed apron and frame broken away. Fig. 4ª represents a top plan view of the pulleys and gearing which, in connection with the governing device, operates and turns the feed apron and roller. Fig. 5 represents a front side elevation, on enlarged scale, of part of the machine illustrating the folding channel, pasting devices, and operating mechanism. Fig. 6 represents a vertical longitudinal section of a part of the carding cylinder, its casing and guide hopper. Fig. 7 represents a vertical transverse section of the carding cylinder, its casing, and the feeding devices. Fig. 8 represents a sectional detail view of the feed rollers, apron, and bridge. Fig. 9 represents a detail side elevation, on enlarged scale, of the gearing for operating the feed mechanism. Fig. 10 represents a sectional detail view, on enlarged scale, of the feed roller, apron and part of the governing mechanism. Fig. 11 represents a top plan view, on enlarged scale, of the folding channel and attachments. Fig. 12 represents a vertical longitudinal section thereof. Fig. 13 represents a perspective view, on enlarged scale, of the tapering bridge trough for curving the carrier tape and ribbon. Fig. 14 represents a perspective view, on enlarged scale, of the detachable guard device. Fig. 15 represents a sectional detail view of the compressing rollers in connection with a part of the folding channel. Fig. 16 represents a detail view in elevation of the paste wheels and their gearing. Fig. 17 represents a top plan view of the paste can and wheels. Figs. 18 and 19 represent transverse sectional detail views taken respectively on the lines 18 and 19, Fig. 11, through the tapering bridge trough and guard device. Fig. 20 represents a transverse section through portions of the upper and lower compressing rollers and the folding channel, taken on line 20, Fig. 11. Figs. 21, 22, 23, 24, 25, 26, and 27 represent transverse sections through the folding channel and its attachments taken respectively on the lines 21, 22, 23, 24, 25, 26, and 27, Fig. 11. Fig. 28 represents an end elevation, on enlarged scale, of the cutting mechanism. Fig. 29 represents a side elevation, on enlarged scale, of the cutting mechanism. Figs. 30 and 31 represent details of the cutting mechanism.

The working parts of my improved machine are mounted upon and supported by the frame F, the bracket frame F', the supporting frames $F^2$ and $F^3$, the longitudinal table T and supplementary table T', all properly secured together for making a rigid support. The bracket frame F' is secured to frame F, and projects at right angles to the carding cylinder and folding channel and serves for supporting the feed apron and its table, as shown in Figs. 2, 3 and 4, whereby tobacco stock may be fed in a broad layer to the feed rollers and carding cylinder.

In my present machine, I use only an interior carding and distributing cylinder inclosed within a cylindrical casing in connection with an upper feed roller, a lower roller and feed apron, and a transverse bridge between the upper roller and belt of the lower roller, as shown in Fig. 7. The inner carding cylinder operates in connection with the upper feed roller and the transverse bridge below the same to card and distribute the tobacco into a guide and discharge hopper which conveys it to the filler carrier tape. The outer cylindrical casing 1 is constructed of the metallic end rings 2, and the wooden lagging, $a$, as shown in Figs. 6 and 7. The metallic end rings 2, are suitably secured to the frame F, and are provided with interior annular grooves $b$, into which are set the ends of the lagging $a$, which lagging extends from the upper feed roller 26, around the supporting rings to the frame plate F, at the rear side of the machine forming a large segment of a circle, as shown in Fig. 7, and leaving the carding cylinder partially exposed for placing adjacent thereto the feeding devices, revolving brush, &c., and also for permitting the tobacco to fall into the guide hopper 3, at the under side of the casing. At the top of the end rings 2 (Figs. 6 and 7) are provided two short segmental plates $c$, having set screws, $c'$, for conveniently securing the top lagging strip $a$ in position or removing it from the rings 2. The top strip $a$ having been removed, other strips may be slid up in the grooves, $b$, and removed from the rings 2. The guide and discharge hopper 3 is constructed of two inclined plates converging from above to the guide channel 4 at the bottom. One inclined plate connects at the top to the cylindrical casing $3^a$, which incloses the brush, and at the bottom to the channel 4 and serves to convey the tobacco from the carding cylinder and brush into said channel. The casing $3^a$ is made cylindrical and closely embraces and nearly encircles brush 17, but has an opening adjacent to the carding cylinder, as shown in Fig. 7. The guide channel 4, closes the bottom of the guide hopper and is provided with lateral grooves or recesses, $4^a$, extending its whole length for receiving the edges of the carrier tape and ribbon. A removable side strip $4^b$, having set screw, is provided for giving access to insert or remove the filler carrier tape. By means of channel 4, the tape and ribbon are inclosed and guided and tobacco is prevented from dropping out from the hopper. A long door $3^b$, is preferably secured in the rear side of the frame F, opposite the guide hopper. The carding cylinder 5 is constructed of metallic end plates $5^a$, having inwardly projecting annular flanges $5^d$ and the wooden lagging strips $b'''$, supported at their ends upon said flanges $5^d$ as shown in Fig. 6. The cylinder 5, is covered with card clothing $5^b$, having suitable teeth, as shown. The cylinder 5 is secured to shaft 6 which is mounted in journal boxes 7 in frame F, and to the outer end of shaft 6 is secured the belt wheels 8, $8^a$, over which are passed the flat cross belt 9 and the round belt 10. The belt 9 is crossed as shown in Figs. 1 and 3, and also passes over the pulley 11 on power shaft 12, for the purpose of turning the carding cylinder from left to right, so that the teeth pass downward toward the feed roller and transverse bridge bar 40. Round cross belt 10, on pulley $8^a$ passes around pulley 15 on shaft 16 for turning the brush 17 in the opposite direction to the carding cylinder. The brush turns from right to left more than three times as fast as the carding cylinder. The brush 17 is constructed with tufts of bristles, closely set in a cylindrical core, so as to form a close thick bristle surface at its circumference, which will practically prevent the lodgment of fibers of tobacco. The cylindrical casing of the brush is also made to closely embrace it, as shown in Fig. 7, so that there shall be no room for the lodgment and accumulation of tobacco between its inner surface and the surface of the brush. With this construction and arrangement of the brush and its casing, danger from clogging of the tobacco is avoided and much better results secured. Shaft 16 of the brush is preferably set in adjustable bearings (Figs. $3^a$ and $3^b$) composed of a flanged disk 18, having an eccentric opening and screw-threaded boss, $18^a$, through which opening and boss is passed the shaft 16. Disk 18 is set in a circular opening in each of the end frames F, and screw nut 19 is screwed upon the threaded boss 18ª and tightly against the frame F, for holding plate 18 in any desired position. It is evident that by turning the disks 18 in their openings in the frame, the shaft 16 and brush may be set closer to or farther from the carding cylinder. As the brush becomes worn at its circumference and thus reduced in diameter, it may be set closer to the carding cylinder by the adjusting disks 18 in their openings. The main power shaft 12, is supported in bearings, d, secured to the frame of the machine and is provided with a belt pulley 13, over which is passed the main power belt 13ª and also with a shifting clutch 14, with which there connects the pivoted shifting lever 14ª, which is pivoted to a hanger 14ᵇ (Figs. 1 and 2).

The bracket frame F', supports a feed table 22, of wood or other suitable material, and is provided at its outer or front end with an adjustable roller 21, over which passes the broad feed apron 20, as shown in Figs. 2, 4 and 7, and said apron at the inner end of the table passes over roller 23, suitably journaled in the side frame below the feed roller 26. At its inner end roller 23, Fig. 9, is provided with a gear wheel 24, which meshes with a similar gear wheel 25 on the shaft of the feed roller 26 and also with a pinion 27, mounted on a stud or pin 28, which also carries the large gear wheel 29, which meshes with a pinion 30, mounted on a stud or pin 31, which also carries the large gear wheel 32, which meshes with a pinion 33, formed on the hub of the belt pulley 35, which is mounted upon a stud 34 secured to the frame of the machine.

The axle of the toothed feed roller 26, Fig. 10, is provided at each end with a journal box composed of two half boxes set in the frame 36, having an adjusting screw 37, and said journal boxes and axle are arranged at each end of the roller in a casing 38, containing a coiled spring 38ª and having an adjusting screw 39 for said spring, by means of which the toothed feed roller is permitted to yield in an upward direction by means of any pressure, such as would be caused by an undue bulk or thickness of tobacco passing between the feed apron and the feed roller.

The coiled spring 38ª in the casing, forces the feed roller back to its normal position after being relieved from the extra thickness of tobacco. The above mentioned upward and downward movements of the feed roller 26 in casing 38 serve to operate the governing devices for controlling the speed of the gearing which turns the feed apron and feed roller, so as to thereby regulate the feed of tobacco to the carding cylinder, as will be hereinafter more specially described.

A triangular bridge bar, 40, having curved faces, is arranged transversely across the feed apron 26, as shown in Figs. 7 and 8, for better conducting tobacco from the feed apron into contact with the teeth of the carding cylinder, so that such tobacco may be more evenly picked apart and distributed by the carding cylinder. This bridge bar has proved quite useful in practice, since it prevents lumps of tobacco from falling down without being properly acted upon by the carding teeth.

The carding cylinder 5 acting in conjunction with toothed feed roller 26, and the transverse bridge bar 40, effectively cards and distributes the tobacco into the guide and discharge hopper 3, which discharges it into the guide 4 and onto the filler-carrier tape.

The feed apron and feed roller are given motion through the medium of their gear wheels and the train of gearing from 27 to 33, shown in Fig. 9, the pulley 35, belt 41, passing over said pulley 35 and the lower pulley 42. The pulley 42 is secured to a short shaft 43, which is mounted in journal boxes in the frame F³ and in the bracket frame F⁴, as shown in Figs. 3, 4 and 4ª.

The shaft 43 is provided with a set of cone gearing 44, which meshes with a corresponding set of gears 45, composed of separate gear wheels, $a'$, $b'$, $c'$, and $d'$, secured to the short sleeve shafts $a''$, $b''$, $c''$, and $d''$ and the gear $e'$, which, together with the sleeve shafts, are secured to the shaft 46. The multiple pulley 47 is composed of separate disks or wheels connecting with the above mentioned sleeve shafts and shaft 46, and around said multiple pulley is passed a round belt 48, which is also passed over the broad pulley 49, secured to the power shaft 12, as shown in Fig. 1. A belt shifter 56, which forms part of the governor, engages with the round belt 48 for shifting it onto the different disks of the multiple pulley 47 for controlling the speed of the feed apron and feed roller, as will now be described in connection with the governor mechanism.

The governing mechanism in my present invention connects directly with the upper feed roller and is automatically controlled by the rise and fall of said roller, which has its journal boxes arranged in the casings 38, as shown in Figs. 9 and 10. On each side of the feed apron and below the same, horizontal levers 50, are pivoted at $f$, to the frame of the machine or to the ring 2 (Figs. 7 and 10) and such levers are connected by curved rods 51 to the frame 36, inclosing the journal boxes of the feed roller 26. To the outer ends of levers 50, there are pivotally connected at $g$, the connecting rods 52, which are connected at $h$, to the transverse equalizing bar 53, (Fig. 3ᶜ,) to which there is connected at $i$, the link 54, which connects at $k$, with the right angle lever 55 which is pivoted at $z$ to the frame F and at its lower end connects at $l$, with the horizontal belt shifter 56, which, as above explained, engages with the round belt 48 on multiple pulley 47. A spiral spring $m$, Fig.

1, connects with lever 55 and with the frame of the machine for drawing back the belt shifter to its normal position.

In case too large a quantity or thickness of tobacco stock is supplied on the feed apron and passed between it and the feed roller 26, such roller is pressed upward in the casing 38, thereby raising the pivoted levers 50 and moving the belt shifter 56 and shifting belt 48 upon one of the disks of the multiple pulley 47 which connects by a sleeve shaft with one of the smaller gear wheels of the cone gearing 45, which meshes with the cone gearing 44, whereby the shaft 43 and its pulley 42 will be run slower, causing the feed apron and feed roller to be run slower until the excessive quantity of tobacco has been passed off from the feed apron to the carding cylinder. As the quantity or thickness of tobacco passed between the feed apron and the feed roller is reduced the feed roller again falls and again controls the belt shifter, so as to increase the speed of the gearing, feed apron, and feed roller. It will thus be seen that the governing mechanism operates to run the feed devices faster or slower and thus regulates the supply of tobacco which is fed to the carding cylinder and distributed therefrom through the guide hopper onto the paper wrapper and carrier tape to form the filler rod. A filler-rod of more even and uniform thickness is thus produced.

The endless filler carrier tape, 57, passes at the front end of the machine over the pulley 58, which is journaled in an adjustable block, 58ª, thence passes through the guide channel 4, at the bottom of guide hopper 3, thence through the curving trough or channel and the folding channel and around the large wheel 59, and over the tension roller 60, to the pulley 58. The tension roller 60, is journaled in one end of a pivoted lever 61, which is pivotally connected at $n$, to a hanger 62, and has attached to its outer end a cord $o$, to the lower end of which is attached a weight 63, for causing the roller 60 to bear with sufficient pressure upon the tape 57 to take up the slack thereof. The paper ribbon 64, which forms the wrapper is taken from a reel 65, which is suitably mounted near the front end of the machine, as shown in Fig. 1. By reference to Figs. 1ª, Sheet 7, it will be seen that the reel 65 is connected to an arm 66 by means of a screw 67, which forms a stud shaft for said reel. I provide a tension device for the reel consisting of a lug 68, projecting from arm 66, and an adjustable screw 69 passing through said lug and having at its inner end a rubber cushion which bears lightly against the interior surface of the rim of the reel. The screw 69 may be adjusted to bring the desired tension upon the reel. The large tape wheel 59, is secured to shaft 70, which is supported in a long sleeve or journal 71, at the lower end of a hanger 72, secured to table T, as shown in Figs. 1 and 4. A lateral bracket or toe, 73, projects from the hanger 72, and carries a stud shaft on which is mounted a toothed hub or pinion 75 and a beveled gear wheel 76. A toothed wheel 74 is secured to shaft 70, and meshes with the toothed hub 75. The beveled gear wheel 76 is rigidly connected to the hub 75 and meshes with the beveled pinion 77, secured to shaft 12. By means of the gearing 74, 75, 76, and 77, the wheel 59 is turned for traversing the filler carrier tape 57 through the folding channel, &c.

The folding channel and its immediate attachments and connections and the pasting device, together with their operating mechanism, will now be described as follows:—The folding channel (Figs. 1, 5, 11 and 12) and its attachments are mounted upon a supplementary table T', which is supported by legs, $y$, upon table T. At the front end of the folding channel 95 and between it and the rear end of the guide channel 4, I provide the tapering curved trough or channel 78, having inwardly turned edges, as shown in Figs. 13, 18 and 19. The front end of the tapering trough 78 is made comparatively broad and shallow in cross section, as shown in Fig. 18, while the rear end is made deep and narrow in cross section, as shown in Fig. 19, for properly curving the carrier tape and ribbon. The inwardly turned edges 78ª, serve to hold the tape and ribbon in place and protect their edges as they are being curved into a U-shape while passing through the channel 78. A compressing roller 79, having at one side a grooved hub or pulley 80, is journaled in a housing 79ª at the outlet of guide channel 4 and above the trough 78, as shown in Figs. 1, 5, and 12. The compressing roller 79, is preferably formed with a flat roughened peripheral face. Above the folding channel 95 a shaft 83 is mounted in suitable bearings in short standards rising from table T', and has secured to it a pulley 82, a compressing roller 84, and a beveled pinion 85, which latter meshes with a horizontal pinion 86, secured to the top of the vertical shaft 87, which is supported at its lower end in hanger 88, secured to table T, as shown in Figs. 2 and 5. A round belt 81 passes over the grooved hub or pulley 80, on roller 79 and also around the pulley 82 on shaft 83. The vertical shaft 87 is provided with a worm wheel 89 which meshes with the worm 90 on the countershaft 91 and motion is transmitted to the transverse shaft 83 through the medium of the beveled gear 86 and pinion 85, thereby turning the compressing rollers 79 and 84. The countershaft 91 is supported in bearings $q$, held by the hangers 92. The shaft 91 also carries a worm 124 and a sprocket wheel 129. As shown in Figs. 12, 15, and 20, the grooved compressing roller 84, projects into the folding channel 95, so that its grooved periphery shall roll down the tobacco stock which is carried forward by the carrier tape and paper ribbon. Immediately below the roller 84, an opening 95ª is formed at the bottom of the folding channel 95, through the table T', for receiving the peripheral edge of the lower roller 93. The compressing roller 93 is formed with a deep annular groove having thin edges and wider than the upper compressing roller 84, so that the carrier tape and ribbon may be received thereby, as shown in Figs. 15 and 20. The roller 93 is supported by its axle in hangers from the table T', Fig. 5 and is turned by frictional contact of the filler carrying tape when carrying the filler. To the opposite walls of the folding channel 95 are secured the longitudinal guard plates 96, which extend down into the channel adjacent to roller 84 and serve to protect the turned up edges of the carrier tape 57 and paper ribbon 64, from said roller, as clearly shown in Fig. 20. A detachable guard device 94 (Figs. 11, 12, and 14) is composed of the side plates $r$, connected at the top by bows $s$, and is adapted to be set into the trough 78 and folding channel 95 and extends to the guard plates 96 and may be secured in place by a small set screw $u$. This device, as its plates $c$ are higher than the channel, serves to prevent the tobacco from spreading over the side of the tapering trough 78 and folding channel 95. Just beyond roller 84, there is secured in channel 95 a scraper 97, which bears at its front end upon the grooved surface of roller 84 for scraping and detaching therefrom the roll of tobacco, constituting the filler. Beyond this scraper, there is secured in the channel a longitudinal compressing finger 98, having a bent arm 99, which is secured by set screw $v$, to the wall of the channel. The front end of the compressing finger 98 is slightly curved upward, and the finger is slightly inclined from its front to its rear end for better compressing the tobacco into a filler rod, as shown in Figs. 12 and 22. A guard plate 100, having its inner edge turned down nearly parallel with the wall of the channel, is secured in place by set screws $w, w$, as shown in Figs. 11, 12, 23 and 24 and serves for holding in a vertical position the left hand edge of the carrier tape and paper ribbon preparatory to the application of paste by the paste wheel to the standing edge of the paper ribbon. Opposite to the guard plate 100, there is secured to the right hand side of the folding channel the first deflector 101, having a bent arm, 102, through which is passed a set screw for securing it in place. This deflector serves to turn down the right hand edge of the tape and paper ribbon upon the filler. Beyond the deflector 101, there is placed in the channel, a separator 103, having a bent arm 104, through which is passed a set screw $y'$, for securing it in place, and such separator serves to separate the carrier tape from the turned down edge of the paper wrapper allowing the edge of the tape to rise as shown in Fig. 25. Opposite this separator the paste wheel 128 projects down into the folding channel, on the left hand side thereof, and applies paste to the standing edge of the paper. Beyond the separator is provided a guard plate 105, secured to the right hand side of the channel by set screws $z$, and having its inner edge turned downward into the channel. This plate serves for holding the right hand edge of the tape in a vertical position, as shown in Fig. 26. Opposite the guard plate there is secured to the left hand side of the channel, a deflector 106, having a bent arm 107, through which is passed a set screw $f'$, for holding it in position. This deflector turns down the left hand edge of the tape and the pasted edge of the paper wrapper upon the previously turned down right hand edge of the paper wrapper. Beyond the last mentioned deflector there is arranged in the channel a long transversely curved plate 108, having a bent arm 109, through which is passed a set screw $g'$, for holding it in position (Fig. 27) the said plate being between the opposite edges of the tape and bearing upon the pasted edge of the paper wrapper, in order to seal the edges of the paper together and make a finished joint. The continuous cigarette, formed as above described, passes from the folding channel, over the top of wheel 59 into the tubular holder 140, where it is cut into short lengths by the cutter as will be hereinafter described.

The paste can 110 is mounted upon the table T, extending up above the supplementary table T', and in practice, is provided with a piston not here shown, which is attached to the usual rod, which is provided at its lower end with a rack bar 111 (Fig. 1) with which there meshes a pinion (not shown), which, in practice, is secured to shaft 112, which is supported in a hanger secured to table T and has secured to its outer end a grooved pulley 113, to which there is attached a cord 114, having at its lower end a weight 115. This mechanism serves to operate the piston to force up the paste in the can and feed it through the slotted lip 116, to the upper horizontal paste wheel 119. The slotted lip 116 is secured near the upper end of the paste can and is provided with a scraper 117, which has a notched head with which there engages the adjusting screw 118, for scraping superfluous plaste from the edge of the paste wheel 119. The horizontal paste wheel 119 is secured to the upper end of the vertical shaft 120, which passes through the hollow post or journal 121, and is supported at its lower end in the hanger 122, secured to table T, as shown in Figs. 5 and 16. The shaft 120 is provided with a worm wheel 123, which meshes with the worm 124 upon shaft 91, by means of which the paste wheel is turned. To the upper end of shaft 120, below the horizontal paste wheel, is secured a beveled gear wheel 125, which meshes with a beveled pinion 127, upon the short shaft secured in a horizontal arm 126. The vertical beveled paste wheel 128, is connected at its hub with pinion 127, so as to turn therewith and it bears at its peripheral edge against the beveled edge of paste wheel 119 and also projects into the folding channel 95, for applying paste to the standing edge of the paper wrapper, as before described. As shown in Fig. 17, the vertical paste wheel 128, is arranged in an inclined or diagonal position in the folding channel and turns from left to right against the traveling tape and paper wrapper so as to assist in keeping the latter in a standing position and prevent it from being creased or broken. The countershaft 91 (Figs. 1 and 5) is given motion through the medium of the sprocket wheel 129, which is secured to said shaft, the sprocket wheel 130 secured to power shaft 12 and the sprocket chain 131, which passes around said wheels. A fly wheel 132, provided with a handle, is preferably secured to the rear end of power shaft 12 for turning such shaft by hand when desired.

The cutting mechanism for cutting the continuous cigarette rod into short lengths will now be described as follows:—The cutting mechanism is constructed and arranged to reciprocate longitudinally, so as to move forward with the continuous cigarette during the instant in which it is cut through, so as to avoid bending or crimping such continuous cigarette and therefore avoid bursting the freshly sealed wrapper. The cutting mechanism is also quite simple in construction, and the reciprocating carriage consists simply of two sleeves 133 and 134, one above the other, mounted to slide upon the guide rods 135 and 136, which are supported in end standards 137 and 138, upon the table T, said guide rods having the coiled springs, $g'$ and $g''$, between the ends of the sleeves and the standards. These springs act as buffers for the carriage sleeves and assist in imparting reciprocating motion thereto.

The curved bar 139 is secured to the sleeves 133 and 134 by suitable nuts, and connects them together, as shown in Fig. 29. The curved bar 139 projects down through table T and is provided at its lower end with a roller $i'$, working in the cam groove $p'$, and its upper curved end carries the tubular cigarette holder 140, which is slotted or divided transversely for admitting the cutter disk to sever the passing continuous cigarette. To the rear end of sleeve 134 there is pivotally connected at $l'$, the oscillating lever 141, which lever is provided above its pivotal eye with a transverse enlargement having a slot, $k'$, through which passes the upper sleeve 133, permitting the lever to be vibrated transversely. The sleeve 133 is provided with a collar and with a nut, one on either side of lever 141 for guiding it in its transverse movement and preventing longitudinal displacement. The lever 141 is provided at its lower end with an adjustable plate $m'$, of hard metal adapted to bear upon cam 149 and at the upper end it carries a short stud shaft 142, upon the outer end of which is mounted the cutter disk 143 and a connected grooved pulley 144 over which is passed the round belt 145. The grooved pulley 146 is mounted so as to turn and slide back and forth upon the sleeve 134 and acts as an idler for the round belt 145 to bear against as the carriage is reciprocated. The belt 145 also passes around the grooved pulley 148 formed on the cam wheel 147. Lever 141 is provided near its upper end with a lateral pin $n'$, which may have a roller and bears against the flat spring $o'$, which is secured to the sleeve 133 for drawing the upper end of the lever and cutter disk back from the holder after each cut of the continuous cigarette. Cam wheel 147, constructed with the belt groove 148 and a cam groove $p'$, is secured to the countershaft 91. The broad faced cam 149 is separately secured upon shaft 91, so that it may be adjusted in proper relation to the cam wheel 147, for causing the cutter disk to sever the cigarette rod at the right instant. A rectangular opening 150 is formed in table T (Fig. 2) below the cutter carriage for passage of the curved bar 139, oscillating lever 141 and belt 145 to the cams and groove below.

The machine may be operated for the manufacture of cigarettes as follows: The filler carrying tape and paper ribbon being arranged in position in the guide channel 4, at the bottom of hopper 3, in the curving trough or channel 78 and the folding channel 95 and the other parts of the machine being in readiness, the clutch 14 is shifted to engage with pulley 13 on the power shaft and the machine thereby set in motion. Fine cut tobacco stock is spread in a thin layer on the feed apron 20, by which it is carried to the toothed feed roller 26, and thence between it and the bridge bar 40 into contact with the carding cylinder, by means of which it is picked open and distributed; then as the carding cylinder revolves the tobacco is brushed and cleared from its teeth by means of the revolving brush 17, which discharges it into the guide hopper 3 and thence on to the paper wrapper and filler carrier tape at bottom of channel 4. The stock is formed into a loose roll in channel 4 from which it is carried forward under the first compressing roller 79, which rolls it down into a more compact form. The rolled stock is thence carried by the tape between the upper and lower grooved compression rollers 84 and 93 in the folding channel by means of which it is rolled down and compressed in the form of a filler rod.

The rod and fibers of tobacco are detached from roller 84 by scraper 97 and the rod thence passes below the inclined compressing finger 98, by means of which the fibers are smoothed down and held in place preparatory to being inclosed by the paper wrapper. As the carrier tape and wrapper travel forward their left hand edges are held in a vertical position by the guard plate 100, while their right hand edges are turned over by the deflector 101, as shown in Fig. 24, and this right hand edge of the tape is separated from the wrapper by the separator 103, while at the same time paste is applied to the left hand standing edge of the wrapper by the paste wheel 128, as shown in Fig. 25. The separated right hand edge of the tape is now held in a vertical position by the guard plate 105, while at the same time the left hand pasted edge of the wrapper and also the tape are turned down by the deflector 106, and one edge of the wrapper pressed upon the previously turned down edge of the wrapper, as shown in Fig. 26. The inclosed filler is thence traversed by the tape below the curved plate 108 in the folding channel which separates therefrom the left hand edge of the tape and also serves to seal the pasted edges of the wrapper together and make a neat clean joint.

As the carrier tape and continuous cigarette pass out from the folding channel, the tape is spread open by passing upon the large wheel 59, while the continuous cigarette is carried forward into the holder 140, where it is cut into cigarette lengths by means of the cutter disk on the oscillating lever 141, which is carried by the reciprocating carriage above described. During the transverse forward stroke of the cutter disk through the continuous cigarette for cutting it into short lengths, the carriage is moved forward in line with the continuous cigarette by means of the curved bar 139, engaging with the cam groove $p'$, in the cam wheel 147, so that there is no back pressure on such cigarette during the cutting stroke, and consequently no liability to burst the wrapper or separate its freshly sealed edges.

During the operation of the machine the feed of stock to the carding and distributing cylinder and thence to the wrapper on the carrying tape in the bottom of channel 4 is regulated and controlled by my governing mechanism, as hereinbefore described.

By means of my improved machine, I obtain a well formed, smooth and merchantable cigarette.

Having described my invention, what I claim, and desire to secure by Letters Patent, is—

1. In a cigarette machine, the combination with the cylindrical casing and interior carding cylinder, of the front roller, the traveling feed apron passing over said roller and leading to said carding cylinder, a toothed feed roller above said apron and front roller and adjacent to and cooperating with said carding cylinder, a guide hopper and filler carrier tape below the carding cylinder, substantially as described.

2. In a cigarette machine, the combination with the cylindrical casing, interior carding cylinder and a guide hopper, of the feed apron, a feed roller above said apron and a transverse bridge bar between said apron and upper roller for guiding tobacco from the feed roller and apron to the carding cylinder, substantially as described.

3. In combination with the cylindrical casing, the interior carding cylinder, a guide hopper and a filler carrying tape below said cylinder, a revolving brush having its surface closely set with bristles; and its inclosing cylindrical casing fitting closely thereto and having an opening adjacent to the carding cylinder and its casing and means for feeding tobacco to the carding cylinder, substantially as described.

4. The revolving brush having its surface closely set with bristles, a close fitting cylindrical casing therefor and having an opening at one side, in combination with the carding cylinder, a cylindrical casing inclosing the same and having an opening for said brush, and a guide hopper below said cylinder, whereby tobacco may be removed from the carding cylinder and discharged into the guide hopper, substantially as described.

5. The cylindrical casing and interior carding cylinder, in combination with a guide hopper below said cylinder, a guide channel 4 at the bottom of the hopper having lateral recesses, a filler carrier tape with its edges in said recesses of the guide channel, a removable side strip $4^b$ for inserting the tape and means for feeding tobacco stock to the carding cylinder, substantially as described.

6. The combination with the feed apron and yielding feed roller above the same, of the governing mechanism connecting with said roller and also with a belt shifter, intermeshing cone gearing, a multiple disk pulley connections intermediate each disk and its corresponding gear, a separate pulley on the power shaft, a belt on said pulleys, a shifter engaging said belt and connecting gearing for operating said feed apron and roller, and regulating the speed thereof, substantially as described.

7. In a cigarette machine having a carding cylinder and inclosing casing, the combination with the feed apron on rollers and a vertically movable feed roller above said apron, of belt shifting mechanism consisting of levers pivoted to the frame of the machine and connecting with said feed roller, a pivoted right-angle lever and connecting links, a shifting bar connecting the latter lever with the belt on the pulleys of the operating gearing, and suitable cone gearing, pulleys co-operating therewith, belts and gearing connecting the power shaft with one of the rollers carrying the feed apron and said feed roller for controlling the speed thereof, substantially as described.

8. The combination with the carding cylinder and casing, of a revolving brush adjacent thereto, the disks 18 set in the side frame and having eccentric openings in which are inserted the axles of the brush, and means for securing the disks in place for adjusting the brush with relation to the carding cylinder, substantially as described.

9. The combination with the guide channel 4, the carrier tape therein and means for supplying tobacco thereto, of the tapering trough 78, having inwardly turned edges for curving the tape and wrapper, the folding channel and a guard device 94, set into the trough and folding channel, substantially as described.

10. The combination with the tapering trough 78, having inwardly turned edges and the carrier tape therein of the folding channel and a guard device 94, the latter having side plates located in said trough and channel for retaining the tobacco stock therein, substantially as described.

11. The combination with the folding channel, having a slot or opening through its bottom, of the upper grooved compressing roller, projecting into the channel, a filler carrier tape in the channel, and the lower grooved compressing roller projecting into the opening at the bottom of the channel and having a groove wider than the upper roller and receiving the filler carrier tape, substantially as described.

12. The combination with the folding channel, having a slot or opening in its bottom, of the lower grooved compressing roller, projecting into such opening, the filler carrier tape in the channel and groove of said roller, the lateral guard plates 96, in the channel on each side for protecting the edges of said tape and the upper grooved compressing roller between said guard plates and entering the groove of the lower roller, substantially as described.

13. The combination with the slotted folding channel of the lower and upper grooved compressing rollers, working therein, the filler carrier tape and the scraper 97, in the channel, bearing in the groove of the upper roller for detaching tobacco therefrom, substantially as described.

14. The combination with the guide channel 4, the tapering trough 78, folding channel 95, and carrier tape of the compressing roller 79, above the trough, the upper and lower grooved compressing rollers working in the folding channel and the operating gearing for turning the upper compressing rollers, substantially as described.

15. The combination with the slotted folding channel the lower grooved compressing roller and carrier tape therein of the grooved compressing roller 84 above the channel and having a shaft and pinion, the vertical shaft 87, having a beveled gear wheel at its upper end meshing with said pinion and also having at its lower end a worm wheel, and a worm on a countershaft meshing with said worm wheel for operating said compressing roller, substantially as described.

16. The combination with the folding channel and carrier tape therein, of the longitudinal compressing finger 98 the guard plate 100, for holding up one edge of the tape and wrapper, the deflector 101, for turning down the opposite edge of the tape and wrapper, the paste wheel for supplying paste to the standing edge of the wrapper, the separator 103 for separating the tape from the wrapper, the guard plate 105, serving to hold up the separated edge of the tape; and the deflector 106 for turning down the left hand edge of the tape and pasted edge of the wrapper upon the previously turned down right hand edge of the wrapper for inclosing the filler-rod, substantially as described.

17. The combination with the vertical paste can, having a horizontal slotted lip near its upper end, the horizontal paste wheel working therein and secured to the vertical shaft a beveled gear wheel on said shaft, the vertical paste wheel 128, bearing upon the edge of the horizontal paste wheel and having connected with its hub a beveled pinion meshing with said beveled gear wheel, and mechanism for turning the shaft of the horizontal paste wheel.

18. The combination with the paste can and the horizontal and vertical paste wheels, having beveled edges bearing one upon the other of the intermeshing beveled gear wheel and pinion on the shafts of said wheels, and suitable gearing for turning the vertical shaft of the horizontal paste wheel, substantially as described.

19. In a cigarette machine a reciprocating carriage mounted to slide on guide rods,—a curved bar on said carriage, having a cigarette holder at its upper end and engaging at its lower end with a cam groove, a laterally oscillating lever pivoted to the carriage and carrying at its upper end a cutter disk and bearing at its lower end on a cam in combination with the cams for operating the carriage and cutter disk and means for turning said disk, substantially as described.

20. In a cigarette machine, the cutting mechanism constructed with a pair of longitudinal guide rods, one above the other, sliding sleeves on said rods, a curved bar, 139, mounted upon and connecting said sleeves and having at its upper end a cigarette holder or guide opening and extending at its lower end into a cam groove, the lateral oscillating lever, 141, pivotally connected to the lower sleeve and carrying at its upper end a stud shaft, cutter disk and pulley, and bearing at its lower end upon a cam to give it oscillating motion, all in combination with a cam for sliding said sleeves upon the guide rods, a cam for oscillating the lever carrying the cutter disk and a pulley connecting by a belt with the pulley on said stud shaft which carries the cutter disk for turning said disk, substantially as described.

In testimony whereof I affix my signature in presence of two witnesses.

WILLIAM C. BRIGGS.

Witnesses:
W. T. BROWN,
G. H. COX.